Patented Feb. 15, 1949

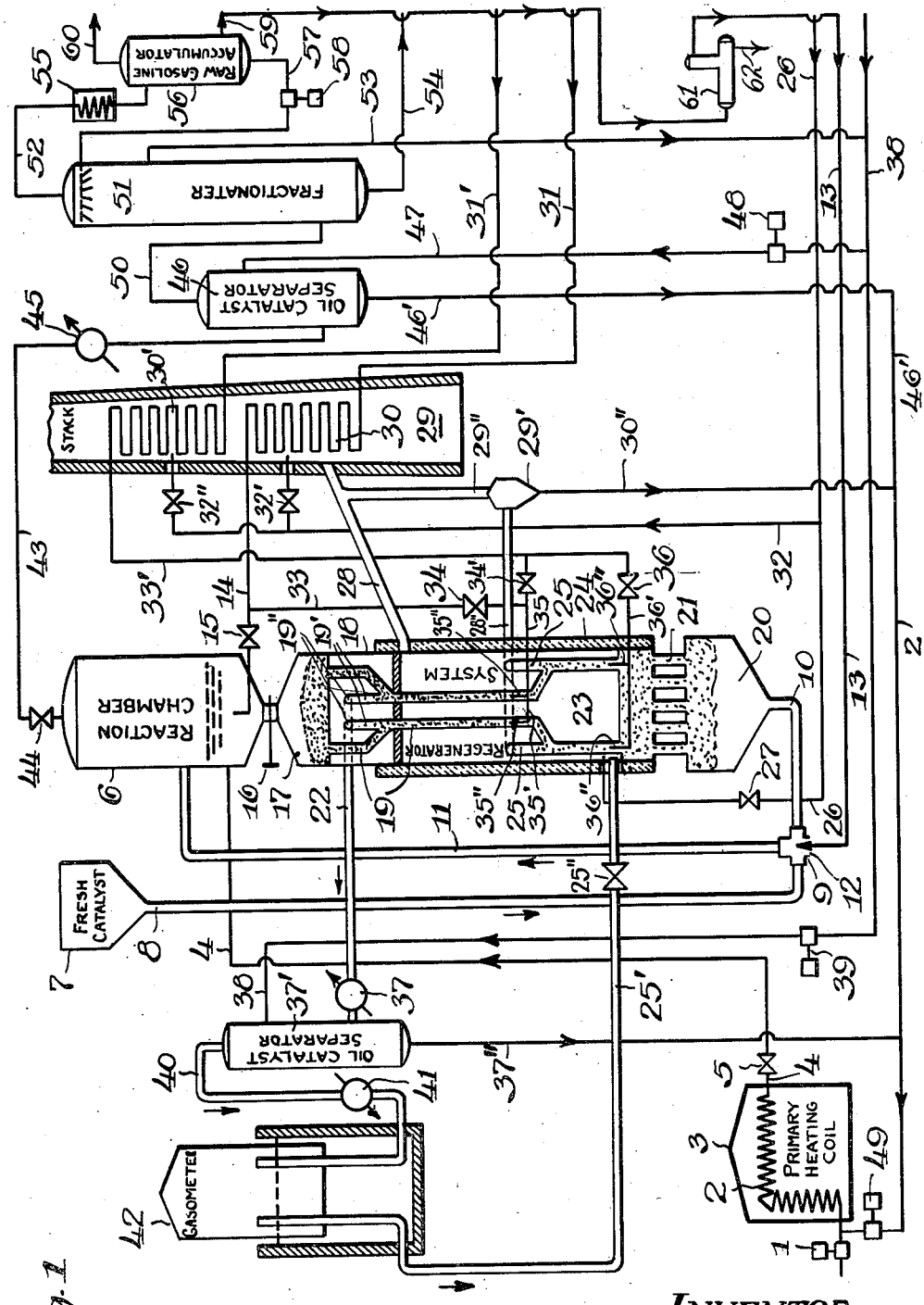

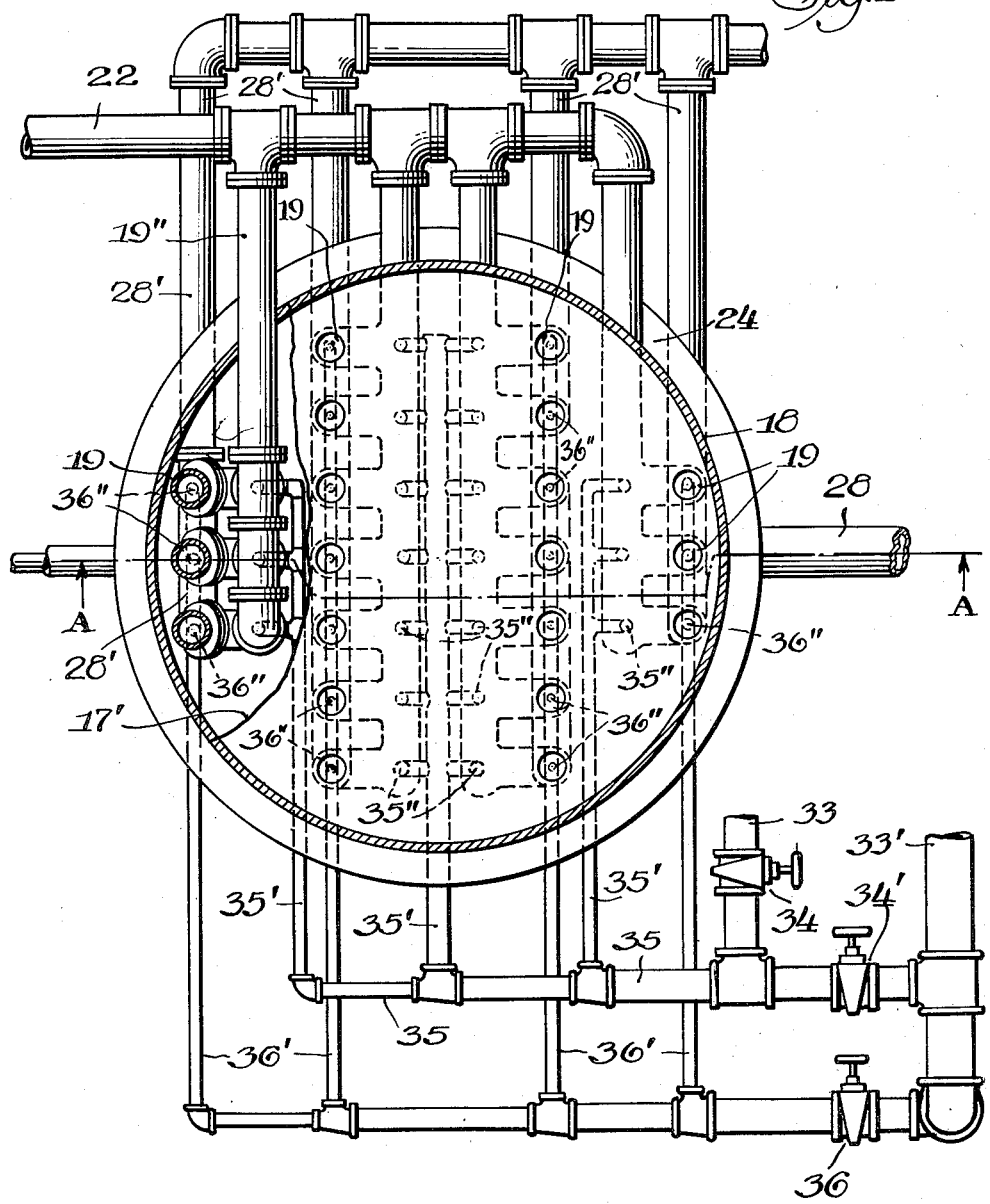

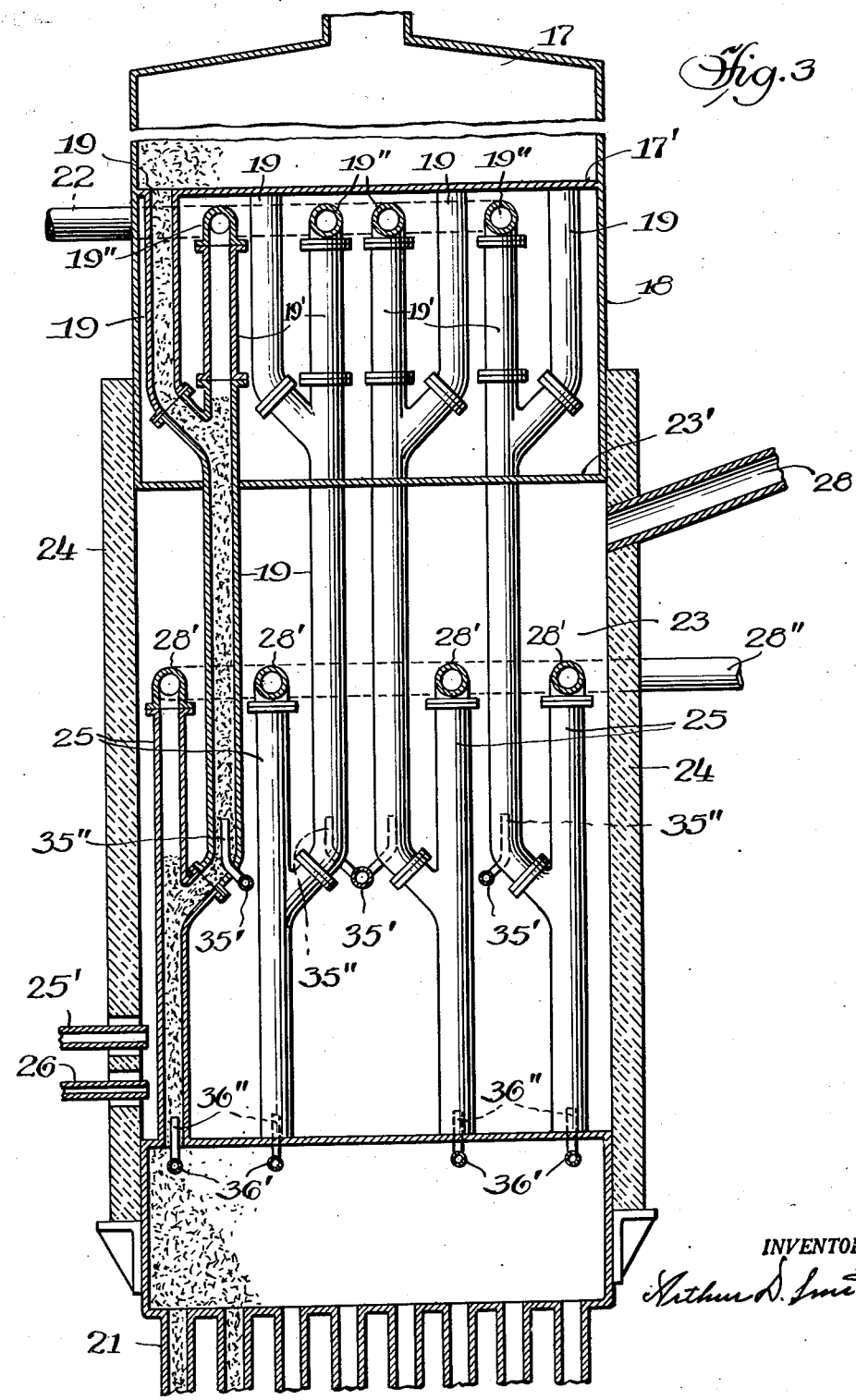

2,461,932

UNITED STATES PATENT OFFICE 2,461,932

PROCESS AND APPARATUS FOR THE TREATMENT OF HYDROCARBON OIL WITH CATALYSTS

Arthur D. Smith, Park Ridge, Ill., assignor to Adsorptive Process Company, Chicago, Ill., a corporation of Nevada Application January 19, 1946, Serial No. 642,388

10 Claims. (Cl. 196—52)

The invention relates to an improvement in process and apparatus for the treatment of hydrocarbon oil with catalysts and more particularly to a process and apparatus for the treatment of petroleum hydrocarbon oil with catalysts impregnated with metallic oxides; production of high octane gasoline and regeneration of the catalyst without ultimate loss of directive power from either overheating or intermediate reduction of one or more of such oxides being important objectives.

A known process for producing gasoline of high octane value comprises contacting a petroleum hydrocarbon oil while under transforming conditions of heat and pressure with dispersed divided bentonite particles impregnated with cobaltic and chromic oxide; regeneration of the catalyst rendered inert through adsorption of carbon being effected by burning off such carbon in a current of air.

In the above process, however, where sufficient air is employed in the regeneration step to completely burn off the carbon, the exothermic reaction involved frequently causes overheating of the catalyst particles with permanent loss of directive power, while if insufficient air is employed reduction of impregnated oxide to a stage of less catalytic activity may occur and the carbon is moreover incompletely removed.

Improvements which completely avoid the danger of overheating the catalyst particles during the regeneration step are recited in co-pending applications for patent and while the processes involved therein leave nothing to be desired with natural and several synthetic catalysts, a certain amount of reduction of oxide in catalysts so impregnated may occur which militates against their optimum in efficiency.

The present invention is an improvement over all of the foregoing, in that not only is adsorbed carbon totally removed without danger of injury to catalyst through excessive temperatures being attained, but the final regenerated catalyst particles are recovered with impregnated metallic oxide in the optimum state of directive activity.

In carrying out the process, I preferably employ as charging stock a petroleum hydrocarbon such as gas, oil, kerosene distillate, naphtha or a mixture of two or more of such products; in short, so-called clean stock, although heavier oils can be used, but with reduced yield of high octane gasoline. The charging stock is continuously fed to a conventional preheating coil and the effluent therefrom, in a vaporized or substantially vaporized condition, and under transforming conditions of heat and pressure, is conducted to a reaction zone where it is continuously contacted with a suitable divided, metallic oxide-impregnated catalyst in dispersed phase. The spent catalyst from such operation, after the greater portion of its associated heavy hydrocarbon is stripped by steam, drops into the charge hopper of a regeneration system, the latter preferably comprising a plurality of tubular members forming an upper decarbonizing zone and a lower oxidizing zone and connecting the charge hopper with a discharge hopper. The decarbonizing zone and the oxidizing zone of the tubular members are disposed in a heat resistant and refractory lined combustion chamber which is provided near the bottom with conventional burners for fluid fuel, and near the top with a breeching for conducting the products of combustion to a stack. In the latter, although not limited to such location, is conveniently installed a steam superheating coil and an air superheating coil in the path of the combustion gases. Such coils may be further independently heated, as required, by additional fuel extraneously supplied.

The combustion chamber serves as an auxiliary means for externally heating the tubular members through which the spent catalyst continuously descends in its process of regeneration, the fuel being conveniently a composite combustible gas generated in the process and supplemented if necessary by independently supplied fuel. The primary source of heat imparted to the catalyst is, however, through the respective agency of a stream of commingled superheated steam and air injected into the decarbonizing zone and a stream of superheated air alone introduced into the oxidizing zone of each tubular member; the superheated steam and superheated air being supplied by the above mentioned superheating coils.

The temperature of the superheated steam and the superheated air, the ratio of the commingled stream thereof to the catalyst in the decarbonizing zone, the ratio of the superheated air alone to the catalyst in the oxidizing zone of the tubular members and the degree of heat maintained in the combustion chamber is so adjusted that the catalyst is heated in the respective zones to predetermined temperatures lying approximately between 900° F. and 1300° F.; the specific temperatures employed within the above stated approximate limits being dependent on the quantity of adsorbed carbon originally associated with the spent catalyst, its specific composition and the degree of reduction of impregnated metallic oxide occurring during decarbonization.

The tendency to impair catalytic activity through overheating the catalyst particles incident to burning off adsorbed carbon in a current of air, is prevented in the present invention by continuously effecting a substantially endothermic decarbonization of the catalyst per unit flow thereof through said decarbonization zone, by contact with said stream of commingled superheated steam and air wherein the free oxygen content of the commingled stream obtains only in sufficient quantity to combine with a predetermined minor portion, preferably 20–25%, of the total adsorbed carbon per said unit flow, the balance or major portion of such total carbon co-actively undergoing metathesis with the steam complement of the said commingled fluid; such method being described in detail in a co-pending application for patent.

While decarbonization is being thus effected in the decarbonizing zone, I concurrently continuously contact the descending catalyst particles in the oxidizing zone of the tubular members with sufficient superheated air to reoxidize any reduced impregnated metallic oxide to its original degree of oxidation; in short, to its greatest directive activity.

During decarbonization of the catalyst the before mentioned composite combustible gas is produced, such gas comprising carbon monoxide, carbon dioxide, hydrogen and nitrogen. This gas is trapped off under a less pressure than obtains in the catalyst filled decarbonization zone, through suitable tubular extensions of such zone, to a gas main; freed from entrained catalyst particles in an oil-catalyst separation zone, and after further cooling to condense any free steam, discharges to a gasometer from which it may be returned to the process conveniently as fuel for the combustion chamber.

During reoxidation of reduced metallic oxide a non-combustible gas comprising nitrogen and excess air is released. This gas is trapped off under a less pressure than obtains in the catalyst filled oxidizing zone, through suitable tubular extensions of such zone; any catalyst particles entrained in such gas being caught in an interposed separating or precipitating means and returned to the process with the initially supplied charging stock in a manner subsequently to be described.

The main body of the regenerated catalyst released from the discharge hopper, together with whatever amount of fresh catalyst is required to replace loss, is continuously introduced into the reaction chamber dispersed in a stream of fluid hydrocarbon actuating a suitable eductive jet means; such carrier fluid being conveniently a by-product of the process, for example, gas from a stabilizer in which raw gasoline produced in the present or other process is depropanized.

While the present invention is particularly directed to a petroleum conversion process involving a catalyst impregnated with metallic oxide wherein any reduction product of such oxide produced during decarbonization of the spent catalyst is concurrently restored to its original state of oxidation, its principles can be more broadly applied. Thus, where the impregnated metallic oxide is of a readily reducible type, for example nickel oxide, and reacts with sulphur derived from the oil processed to form a metallic sulphide, such type of sulphide will, after its reduction, be converted to the original oxide in the oxidizing phase of the present invention; which it will be further noted relates to a general class of catalyst rather than to any specific catalyst of such class.

The transformed vapor from the reaction zone, after first passing through a heat exchanger where its temperature is reduced below a cracking temperature, is stripped of entrained catalyst particles in an oil-catalyst separator and then passes to a fractionator from which raw gasoline vapor is released to a condenser, light gas oil or recycle stock is discharged as a side stream and heavier oil is withdrawn from the bottom as a residual product.

The light gas oil may be recycled in its entirety direct to the process as a part of the charging stock, but I prefer to first employ a portion of the former as a wash oil in the before mentioned oil-catalyst separators, returning the oil-catalyst slurries so obtained to the system as a part of the charging stock and thus reducing catalyst loss to a minimum.

The raw gasoline flowing from the condenser passes to an accumulator from which a small portion is returned to the fractionator as trim stock, the balance being conducted to a stabilizer where it is depropanized according to standard practice. Uncondensed vapor from the raw gasoline accumulator is preferably subjected to one of the known polymerization processes.

In order that the invention may be more clearly understood, reference is made to the accompanying drawings, where Fig. 1 denotes a flow diagram of the process, while Figs. 2 and 3 respectively represent horizontal and vertical cross sectional views of one form of apparatus for regeneration of catalyst as comprehended by the invention; like parts being numbered the same throughout.

Referring to Fig. 1, the pressure pump 1 continuously delivers charging stock to the heating coil 2 disposed in the furnace 3, which is heated by any convenient source of fuel. The coil effluent, in a vaporized or substantially vaporized state and obtaining at a transforming temperature, flows through the line 4, as controlled by the pressure release valve 5, to the reaction chamber 6, where under a pressure which will commonly lie between 75 and 1000 lbs., depending on the composition of the charging stock and specific catalyst employed, it commingles with the latter in dispersed phase.

Fresh catalyst, in a state of subdivision that can be readily propelled and dispersed in a current of fluid carrier hydrocarbon such as any of the $C_1$—$C_3$ alkanes or alkenes, or a mixture thereof, flows downward from the bin 7 through the line 8 to the manifold 9, from whence admixed with hot regenerated catalyst supplied to the said manifold through the line 10 (after the process is in regular operation), it is injected to the reaction chamber in a current of the said carrier hydrocarbon through the line 11 by the agency of the eductive jet 12. The carrier hydrocarbon supplied through the line 13 and delivered under a sufficient pressure to operate the said jet, may conveniently be as previously stated, hydrocarbon gas derived from stabilization of the gasoline produced by the present or other process.

The temperature of the effluent from coil 2 and its degree of completeness of vaporization will be governed to a considerable extent by the specific composition, quantity and temperature of the regenerated catalyst, the coil outlet temperature being so adjusted in relation to the factors immediately above mentioned, that the transforming reaction in the reaction chamber 6 occurs essentially in vapor phase. The exact temperature maintained in the reaction chamber will depend on the nature of the charging stock, composition of catalyst, its quantitative ratio to the oil processed and whether a moderate yield of exceptionally high octane gasoline, or a maximum return of moderately high octane gasoline is the objective; so that no hard and fast figure can be given, although the operative temperature in the reaction chamber will usually lie between 750° F. and 1200° F.

Spent catalyst is stripped from the greater portion of its associated heavy hydrocarbon formed during the transforming reaction by a stream of superheated steam supplied through the line 14, as governed by valve 15. It then discharges from the reaction chamber 6, as controlled by valve 16, to the charge hopper 17 of the regenerator 18, and thence continuously descends through a plurality of tubular members 19, fabricated of heat resistant alloy or other refractory composition, to the discharge hopper 20, which is provided with a cooling means 21; the greater portion of each tubular member extending the length of the combustion chamber 23 being vertically disposed to facilitate the flow of the catalyst particles. The upper sections of the tubular members forming the said decarbonizing zone terminate in Y bends with the lateral or longer branches thereof respectively connecting to the charge hopper, and the shorter vertically disposed extensions 19' to the manifolds 19" which in turn connect to the gas main 22. The tubular members forming the decarbonizing zone also terminate at the bottom in Y bends which connect to the tubular members of said oxidizing zone, the latter being provided with vertically disposed extensions 25 discharging into the line 28"; the shell of the regenerator system being partially cut away in Fig. 1 to better show the above mentioned parts.

The combustion chamber 23, encased in the refractory wall 24, is preferably heated primarily by the before mentioned composite combustible gas as supplied through line 25', and is further equipped with an auxiliary fuel supply (gas or oil) delivered through line 26, as controlled by valve 27; the products of combustion escaping through the breeching 28 to the stack 29. Disposed in the stack 29 and installed in the path of the hot combustion gases is the steam superheating coil 30 and the air superheating coil 30'; the former being supplied by steam from any suitable source through the line 31 and the latter with air through line 31'. An auxiliary fuel supply (gas or oil) for heating the coils is provided through lines 26 and 32, as controlled by valves 32' and 32", thus insuring attainment of the necessary degree of superheat.

The steam, superheated to a predetermined temperature lying approximately between 900° F. and 1300° F. and under the requisite pressure, is delivered through lines 14 and 33, as controlled by valve 34, to the manifold 35. Here it is admixed with the superheated air supplied through line 33', as controlled by valve 34', the commingled steam and air flowing through the multiple jets 35" and upwardly through the decarbonizing zone of the plurality of the tubular members 19 in countercurrent to the descending hot spent catalyst which may be further externally heated, if required, by the means previously described.

While the immediately above described phase is in operation, superheated air supplied by the line 31', as controlled by valve 36, is concurrently injected through the multiple jets 36" and flows upwardly through the oxidizing zone of the tubular members 19 in countercurrent to the descending decarbonized catalyst, which may be further externally heated, if required, by the means previously disclosed.

The commingled superheated steam and air in its upward passage through the decarbonizing zone of the tubular members chemically enters into reaction with the carbon previously adsorbed by the catalyst during the transforming reaction, according to the several equations $C+O=CO$, $CO+O=CO_2$, $C+H_2O=CO+H_2$ and $CO+H_2O=CO_2+H_2$, thus forming the major part of the previously described composite combustible gas and decarbonizing the catalyst.

The superheated air in its upward passage through the descending decarbonized catalyst particles obtaining in the oxidizing zone of the tubular member reconverts any reduced metallic oxide to its original state and will further also convert certain metallic sulphides that may have been formed to oxides.

Since the catalyst in its descent completely fills the tubular members 19, but does not back up appreciably in the vertical extensions 19' and 25, the difference in head pressure respectively prevents the composite combustible gas produced during decarbonization, and the nitrogen and excess air released during reoxidation, from entering the charge hopper. The combustible gas therefore flows through the upper extensions 19' and manifolds 19" to the gas main 22, while the non-combustible gas escapes through the extensions 25 and line 28" to the dry catalyst separator 29' where any entrained catalyst particles are recovered. From such separator, which may be of the known cyclone or electric type, catalyst freed non-combustible gas escapes through the flue 29" to the breeching 28, while the separated catalyst particles flow through the line 30" to the line 2 to become a part of the previously mentioned oil-catalyst slurries returned to the system. Where the amount of spent catalyst handled is relatively small, the manifold 28' and the line 28" may be dispensed with, the non-combustible gas released into the combustion chamber, and any entrained catalyst particles recovered by a dry catalyst separator interposed in the breeching 28.

The operation of the regenerative process can be followed in greater detail in Figs. 2 and 3, which respectively depict a horizontal cross sectional view through the charge hopper of the regenerator looking downward, and a vertical cross sectional view through the regenerator along the plane formed by the line A. A.

Referring specifically to Fig. 2, the upper openings of twenty tubular members 19 are shown as better illustrating the concept of tubular plurality, it being understood any convenient number may be employed in actual practice. Through the broken section of the bottom sheet 17' of the reaction chamber appear the manifolds 19" connecting the several extension tubes 19' with the gas main 22. The superheated steam line 33 and the superheated air line 33', respectively controlled by valves 34 and 34', are clearly shown in this view as connecting to the manifold 35 which supplies the multiple jets 35" through the branches 35'; as also appears the extension of the superheated air line 33' controlled by valve 36 and connecting through branches 36' to the multiple jets 36". The branched manifold 28' and the line 28" for conducting off the non-combustible gas are also shown.

Referring specifically to Fig. 3, it will be noted the upper portion of the tubular numbers 19, the extension tubes 19' and manifolds 19" are protected from the flame of the combustion chamber 23 by the crown sheet 23', this to avoid undue heating of the combustible gas system. The extensions 25, ends of manifold 28', jets 35" and 36", fuel lines 25' and 26 clearly appear and the approximate operative level of the catalyst particles in the several extensions 19' and 25 is shown in the tubular number drawn in cross section. It is to be further understood that the said jets herein depicted as open end tubes may take other forms in actual practice, as for example, a capped tube with a plurality of laterally drilled holes immediately below the cap on one or more circumferential lines.

Returning to a further description of the process with reference to Fig. 1, the gas flowing through the main 22 passes through the heat exchanger 27 wherein its temperature is reduced to slightly below an oil cracking temperature. The gas next enters the oil catalyst separator 37' where any entrained catalyst particles are removed in a stream of wash oil, conveniently gas oil, or recycle oil produced by the process and fed to the separator by line 38, as controlled by pump 39. The thus cleansed gas leaves the separator 37' by the line 40, and after passing through the exchanger 41 where any steam content is precipitated as water, finally enters the gasometer 42 from whence it is supplied as fuel to the combustion chamber through the line 25', as controlled by valve 25", in the manner previously described.

Transformed vapor released from the reaction chamber 6 through the line 43, as controlled by valve 44, after passing through the heat exchanger 45, enters the second oil-catalyst separator 46 where any entrained catalyst particles are removed in a stream of the same wash oil as supplied separator 37'; such oil being fed through line 47, as controlled by pump 48. The catalyst particles removed in separators 37' and 46 are respectively withdrawn therefrom through lines 37" and 46' as an oil-catalyst slurry, such slurry including catalyst particles received through line 30" being introduced to coil 2 by pump 49 to form a portion of the charging stock; the amount of catalyst passing through coil 2 and thence to the reaction chamber being a relatively small portion of the total.

The transformed vapor, freed from catalyst in the separator 46, flows through the line 50 to the fractionator 51, from which raw gasoline vapor, light gas oil or recycle stock, and residual oil are respectively withdrawn through lines 52, 53 and 54. Raw gasoline, condensed in condenser 55, flows to the accumulator 56, from which a portion is returned to the fractionator as trim stock through line 57 and pump 58; the balance flowing through line 59 to a stabilizer 61 for treatment according to standard practice, stabilized gasoline being withdrawn from the system and alkene vapors of low molecular weight returned through the line 13. Uncondensed vapor, released from the system through line 60, is preferably treated by some known polymerization process.

The process is not limited to the exact pressures, temperatures and quantities herein given by way of an example, nor to the means depicted, which latter represents only one embodiment of apparatus suitable for carrying out the invention.

What I claim as new and desire to protect by Letters Patent is:

1. A process for the catalytic conversion of hydrocarbons which comprises: introducing to a conversion zone a stream of fluid hydrocarbon preheated to a transforming temperature and a second stream of fluid hydrocarbon containing dispersed catalyst particles impregnated with metallic oxide, effecting upon comminglement of said streams conversion of a portion of said fluid hydrocarbon into gasoline of high anti-knock value and another portion into carbon with concomitant adsorption of said carbon by said catalyst particles which thereby become spent, releasing converted and unconverted hydrocarbon vapor from said conversion zone to an oil-catalyst separation zone and freeing therein said vapor from entrained catalyst particles dispersed as an oil-catalyst slurry in a stream of wash hydrocarbon oil, conducting the washed vapor to a fractionation zone and discharging therefrom said gasoline of high anti-knock value as a vapor and recycle oil as a liquid, condensing the gasoline vapor to liquid gasoline and returning recycle oil to the oil-catalyst separation zone as said wash oil, commingling the oil-catalyst slurry with the first mentioned stream of fluid hydrocarbon; flowing said spent catalyst particles coated with adsorbed carbon from said conversion zone through a decarbonizing zone in contact with superheated steam commingled with a free oxygen-containing gas wherein such oxygen obtains in only sufficient quantity to combine with a predetermined minor portion of said adsorbed carbon, respectively effecting in said contact combination of said minor portion with said free oxygen and metathesis between the major portion of said adsorbed carbon and said steam, concurrently with decarbonization of said catalyst particles reducing said metallic oxide with co-production of decarbonized catalyst particles and a combustible gas comprising carbon monoxide, carbon dioxide and hydrogen; flowing decarbonized catalyst particles impregnated with reduced metallic oxide from said decarbonizing zone through an oxidizing zone in contact with a superheated free oxygen-containing gas and effecting in such contact reoxidation of said reduced metallic oxide to its original state of oxidation and dispersing the thus regenerated catalyst particles in said stream of fluid hydrocarbon with introduction thereof to said conversion zone in the manner aforesaid.

2. A process for the catalytic conversion of hydrocarbons which comprises: introducing to a conversion zone a stream of fluid hydrocarbon preheated to a transforming temperature and a second stream of hydrocarbon gas comprising methane and containing dispersed catalyst particles impregnated with metallic oxide, effecting upon comminglement of said streams conversion of a portion of said fluid hydrocarbon into gasoline of high anti-knock value and another portion into carbon with concomitant adsorption of said carbon by said catalyst particles which thereby become spent, releasing converted and unconverted hydrocarbon vapor from said conversion zone to an oil-catalyst separation zone and freeing therein said vapor from entrained catalyst particles dispersed as an oil-catalyst slurry in a stream of wash hydrocarbon oil, conducting the washed vapor to a fractionation zone and discharging therefrom said gasoline of high anti-knock value as a vapor and recycle oil as a liquid, condensing the gasoline vapor to liquid gasoline and returning recycle oil to the oil-catalyst separation zone as said wash oil, commingling the oil-catalyst slurry with said stream of fluid hydrocarbon; flowing said spent catalyst particles coated with adsorbed carbon from said conversion zone through a decarbonizing zone in contact with a stream of commingled superheated steam and air wherein the free oxygen content of the commingled stream obtains only in sufficient quantity to combine with a predetermined minor portion of said adsorbed carbon, respectively effecting in said contact combination of said minor portion with said free oxygen and metathesis between the major portion of said adsorbed carbon and said steam, concurrently with such decarbonization reducing said metallic oxide with co-production of decarbonized catalyst particles and a combustible gas comprising carbon monoxide, carbon dioxide, hydrogen and nitrogen; flowing decarbonized catalyst particles impregnated with reduced metallic oxide from said decarbonizing zone through an oxidizing zone in contact with a stream of superheated air and effecting in such contact reoxidation of said reduced metallic oxide to its original state of oxidation, and dispersing the thus regenerated catalyst particles in said stream of fluid hydrocarbon with introduction thereof to said conversion zone in the manner aforesaid.

3. A process for the catalytic conversion of hydrocarbons which comprises: introducing to a conversion zone a stream of fluid hydrocarbon preheated to a transforming temperature and a carrier stream comprising alkanes of lower boiling point than gasoline and containing dispersed catalyst particles impregnated with metallic oxide, effecting upon commingelment of said streams conversion of a portion of said fluid hydrocarbon into gasoline of high anti-knock value and another portion into carbon with concomitant adsorption of said carbon by said catalyst particles which thereby become spent, releasing converted and unconverted hydrocarbon vapor from said conversion zone to an oil-catalyst separation zone and freeing therein said vapor from entrained catalyst particles dispersed as an oil-catalyst slurry in a stream of wash hydrocarbon oil, conducting the washed vapor to a fractionating zone and discharging therefrom said gasoline of high anti-knock value as a vapor and recycle oil as a liquid, condensing the gasoline vapor to liquid gasoline and separating out uncondensed alkanes, returning recycle oil to the oil-catalyst separation zone as said wash oil, commingling the oil-catalyst slurry with said stream of fluid hydrocarbon; discharging from said conversion zone to a regeneration zone comprising a decarbonizing zone and an oxidizing zone disposed in a combustion zone said spent catalyst particles coated with adsorbed carbon, flowing such particles through the decarbonizing zone in countercurrent contact with a stream of commingled superheated stream and air wherein the free oxygen content of the commingled stream obtains only in sufficient quantity to combine with a predetermined minor portion of said adsorbed carbon, respectively effecting in said contact combination of said minor portion with said free oxygen and metathesis between the major portion of said adsorbed carbon and said steam, concurrently with such decarbonization reducing said metallic oxide with co-production of decarbonized catalyst particles and a combustible gas comprising carbon monoxide, carbon dioxide, hydrogen and nitrogen; conducting the combustible gas to said combustion zone; flowing decarbonized catalyst particles impregnated with reduced metallic oxide from said decarbonizing zone through said oxidizing zone in countercurrent contact with superheated air and effecting in such contact reoxidation of said reduced metallic oxide to its original state of oxidation with co-production of regenerated catalyst particles and a non-combustible gas, recovering from the non-combustible gas entrained catalyst particles and returning such recovered particles to the system as a part of said oil slurry, and dispersing the regenerated catalyst particles in a portion of said uncondensed alkanes as said carrier stream of alkanes with introduction thereof to said conversion zone in the manner aforesaid.

4. In a cyclic process for the catalytic conversion of hydrocarbons wherein a fluid hydrocarbon obtaining at a transforming temperature is contacted in a conversion zone with dispersed metallic oxide-impregnated catalyst particles with attendant conversion of said fluid hydrocarbon into gasoline and carbon and wherein the catalyst particles become spent through adsorption of said carbon: the steps of discharging from said conversion zone to a regeneration zone, comprising a decarbonizing zone and an oxidizing zone disposed in a combustion zone, said spent catalyst particles; flowing such particles through the decarbonizing zone in countercurrent contact with a stream of commingled superheated steam and air wherein said air obtains in quantity only sufficient to supply the necessary free oxygen for combination with a predetermined minor portion of said absorbed carbon, respectively effecting in said contact combination of said minor portion with said free oxygen and metathesis between the major portion of said absorbed carbon and said steam, concurrently with such decarbonization reducing said metallic oxide with co-production of decarbonized catalyst particles and a combustible gas comprising carbon monoxide, carbon dioxide, hydrogen and nitrogen, conducting the combustible gas to said combustion zone; flowing decarbonized catalyst particles impregnated with reduced metallic oxide from said decarbonizing zone through said oxidizing zone in countercurrent contact with superheated air, effecting in such contact reoxidation of said reduced metallic oxide to its original state of oxidation with co-production of regenerated catalyst particles and a non-combustible gas, recovering from the non-combustible gas entrained catalyst particles and dispersing regerated catalyst particles in a stream of fluid hydrocarbon with introduction thereof to said conversion zone under the conditions aforesaid.

5. In a catalytic oil conversion apparatus comprising a preheating coil with charging means thereto and an effluent line therefrom connecting to a conversion drum: a fresh catalyst supply line leading to a fluid actuated eductive means adapted to inject catalyst particles to said conversion drum, a vapor line leading from said drum to an oil-catalyst separator, means for feeding wash oil to said separator and means for introducing resultant oil-catalyst slurry withdrawn from said separator to said preheating coil, a vapor line leading from said separator to a fractionator and a recycle oil line leading from said fractionator to the means feeding wash oil to said separator, a vapor line leading from said fractionator to a condenser and a flow line leading from said condenser to an accumulator, a flow line leading from said accumulator to a stabilizer and a vapor line leading from said stabilizer for supplying a fluid actuating medium to said eductive means, a valve controlled spent catalyst discharge line leading from said conversion drum to a catalyst regenerator, said regenerator comprising a charge hopper and a discharge hopper connected by a plurality of tubular means divided into an upper decarbonizing and a lower oxidizing means disposed in a combustion chamber with the decarbonizing means respectively connecting to said charge hopper and the oxidizing means to said discharge hopper, tubular means for conveying combustible gas from said decarbonizing means to a gasometer and a return gas line from said gasometer to said combustion chamber, a breeching leading from said combustion chamber to a stack, tubular means for conveying non-combustible gas from said oxidizing means to said breeching, a superheating steam coil and a superheating air coil disposed in said stack, valve controlled tubular means connecting said superheating coils to multiple jets disposed in each tubular means of said decarbonizing means, a valve controlled tubular means connecting said air superheating coil with multiple jets disposed in each tubular means of said oxidizing means, auxiliary heating means for said combustion chamber and said superheating coils, and a regenerated catalyst line leading from said discharge hopper to said eductive means.

6. In a catalytic oil conversion apparatus comprising a preheating coil with charging means thereto, an effluent line therefrom connecting to a conversion drum, and a fresh catalyst supply line leading to a fluid actuated eductive means adapted to inject catalyst particles to said conversion drum: a spent catalyst discharge line leading from said conversion drum to a catalyst regenerator, said regenerator comprising a charge hopper and a discharge hopper connected by a plurality of tubular means divided into an upper decarbonizing and a lower oxidizing means disposed in a combustion chamber with the decarbonizing means respectively connecting to said charge hopper and the oxidizing means to said discharge hopper, tubular means for conveying combustible gas from said decarbonizing means to said combustion chamber, a breeching leading from said combustion chamber to a stack, tubular means for conveying non-combustible gas from said oxidizing means to said stack, a superheating steam coil and a superheating air coil disposed in said stack, valve controlled tubular means connecting said superheating coils to multiple jets disposed in each tubular means of said decarbonizing means, a valve controlled tubular means connecting said air superheating coil with multiple jets disposed in each tubular means of said oxidizing means, auxiliary heating means for said combustion chamber and said superheating coils, and a regenerated catalyst line leading from said discharge hopper to said eductive means.

7. In a continuous process for the conversion of hydrocarbons wherein a fluid hydrocarbon obtaining under transforming conditions of heat and pressure is contacted with dispersed catalyst particles impregnated with reducible metal in the form of an oxide, and wherein such particles become spent through adsorption of carbon and a decomposition product of the reducible metallic oxide, the steps of: respectively completely decarbonizing a flowing stream of said spent catalyst and forming a reduction product from said decomposition product of said reducible metallic oxide in substantially endothermic phase by reaction with preheated commingled steam and air in constant proportions and in constant ratio to the flow of said spent catalyst; subsequently reoxidizing said reduction product of said reducible metallic oxide in the absence of the gases evolved during the decarbonizing treatment; and returning the decarbonized and reoxidized catalyst to the transforming contact.

8. In a continuous process for the conversion of hydrocarbons wherein a fluid sulphur-bearing hydrocarbon obtaining under transforming conditions of heat and pressure is contacted with dispersed catalyst particles impregnated with metal in the form of an oxide reducible by hydrogen, and wherein such particles become spent by adsorption of carbon and transformation of reducible metallic oxide to metallic sulphide, the steps of: respectively continuously completely decarbonizing a flowing stream of said spent catalyst and reducing said metallic sulphide in substantially endothermic phase by reaction with preheated commingled steam and air in constant proportions and in constant ratio to the counter current flow of said spent catalyst; subsequently reoxidizing the reduction product of said reducible oxide as impregnated in said catalyst in the absence of gases evolved during the decarbonizing treatment; and returning the decarbonized and reoxidized catalyst to the transforming contact.

9. In a continuous process for the conversion of hydrocarbons wherein a fluid hydrocarbon obtaining under transforming conditions of heat and pressure is contacted with dispersed catalyst particles impregnated with reducible metallic oxide, and wherein such particles become spent by adsorption of carbon and a chemical reaction product of said reducible metallic oxide, the continuous steps of: respectively completely decarbonizing a flowing stream of said spent catalyst and reducing said chemical reaction product of said reducible metallic oxide in substantially endothermic phase by reaction with gaseous decarbonizing and reducing agents comprising predominantly steam and air in constant proportion and in constant ratio to the flow of said spent catalyst, separating the thus treated catalyst from said decarbonizing agents and the gaseous products thereof; subsequently oxidizing said particles spent by chemical reaction with a gaseous oxidizing agent and returning the decarbonized and reoxidized catalyst to the transforming contact.

10. In a continuous process for the conversion of hydrocarbon wherein a fluid hydrocarbon obtaining under transforming conditions of heat and pressure is contacted with dispersed catalyst particles impregnated with reducible metal in the form of an oxide and wherein such particles become spent through adsorbtion of carbon and the formation of a decomposition product of the reducible metallic oxide, the steps off: conducting a first continuous substantially endothermic reaction between the spent catalyst and preheated commingled steam and air at a temperature not less than about 900° F., in which first reaction all the carbon is removed and said decomposition product of said reducible metallic oxide may form minor quantities of a reduction product; said continuous first reaction being operated with constant proportions of steam and air and in constant ratio to the flow of said spent catalyst; removing said catalyst from the zone of said first reaction; subsequently subjecting said partially treated catalyst in the absence of the gases evolved during the first reaction, to a second reaction under oxidizing conditions such that any minor portion of said reducible metallic oxide which may have been reduced in the first reaction is restored to its original fully oxdized condition; and returning the decarbonized and fully oxidized catalyst to the transforming contact.

ARTHUR D. SMITH.

REFERENCES CITED

The following references are of record in the file of this patent:

UNITED STATES PATENTS

| Number | Name | Date |
| --- | --- | --- |
| 2,342,856 | Hall | Feb. 29, 1944 |
| 2,345,487 | Liedholm | Mar. 28, 1944 |
| 2,353,508 | Schulze | July 11, 1944 |
| 2,378,342 | Voorhees et al. | June 12, 1945 |
| 2,380,391 | Bates | July 31, 1945 |
| 2,390,323 | Peck | Dec. 4, 1945 |
| 2,391,944 | Carlsmith | Jan. 1, 1946 |
| 2,398,186 | Loy | Apr. 9, 1946 |